(No Model.)
L. A. GOODRICH.
MEASURING VESSEL.
No. 361,691. Patented Apr. 26, 1887.
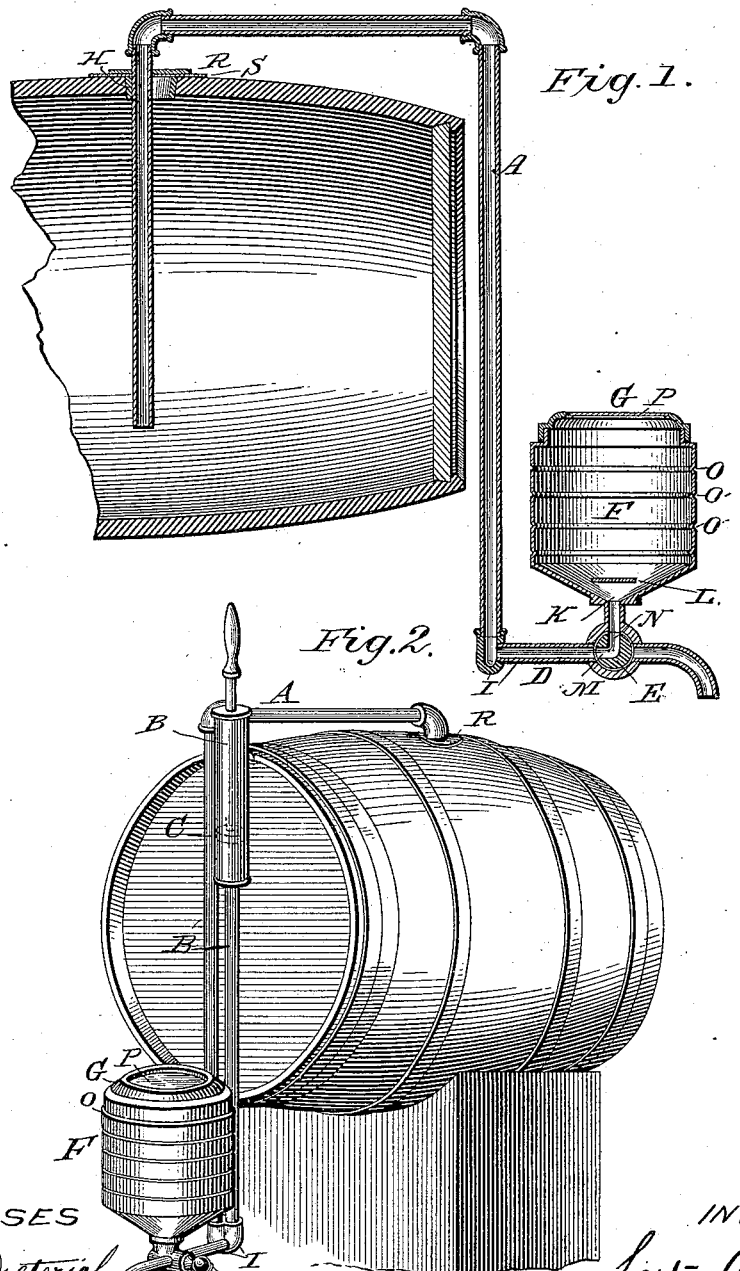
WITNESSES
Fred G. Dieterich
Stephen N. Betts
INVENTOR
Lester A. Goodrich

UNITED STATES PATENT OFFICE.

LESTER A. GOODRICH, OF HILLSDALE, MICHIGAN.

MEASURING-VESSEL.

SPECIFICATION forming part of Letters Patent No. 361,691, dated April 26, 1887.

Application filed November 11, 1886. Serial No. 218,632. (No model.)

*To all whom it may concern:*

Be it known that I, LESTER A. GOODRICH, a citizen of the United States, residing at Hillsdale, in the county of Hillsdale and State of Michigan, have invented a new and useful Siphonic Measure, (for which no patent in this or any foreign country has been granted to my knowledge), of which the following is a specification.

My invention relates to an improvement in siphonic measures.

The object of my invention is, first, to prevent the danger caused by the escape of gas in drawing gasoline and other similar liquids; second, to prevent flies, insects, and other filth getting into the measure in drawing sirups and similar liquids, when such filth would be very objectionable; third, to draw liquids from the top of the cask or vessel, whereby the leakage and waste from faucets inserted at or near the bottom of the cask may be avoided; fourth, to measure the liquid on its passage through the device, thereby avoiding the waste of sloppage and accidents, which the use of funnels and loose measures are liable to.

The following is a full and accurate description of my invention or device.

Figure 1 is a representation of the siphon-measure and bung cut down through the center, giving a central view thereof. Fig. 2 is a perspective view of the siphon-measure and bung in working position.

In the accompanying drawings, A D designate the siphon, of which the lower portion, D, turns outward at or nearly at a right angle. In this portion D is located the two-way turning-cock E, having the orifices M and N, and over the turning-cock E is placed the measure F. Said measure F is made as follows: The measure is made of tin or any suitable material. Near the top and around the measure is pressed an indenture, O, to indicate the height to which it must be filled for a gallon, and below are pressed similar indentures, O', to represent parts of a gallon. The top of the measure F is closed by a cap or close-fitting cover, G, and in the top of this cover or cap G is a glass or transparent substance, P, through which it can be seen when the desired amount is in the measure. Over the orifice K in the bottom of the measure F, and just above it, is a plate or piece of tin, L, fastened to deflect the liquid as it rises and prevent it from striking against the transparent top and destroying its clearness.

At the elbow I there are two orifices, into one of which the portion A of the siphon is screwed. Into the other orifice is screwed the tube or pipe B', that reaches up to the cylinder B, in which is placed the piston C, to start or charge the siphon with. I locate the cylinder B with its top just above the highest part of the siphon A for two separate and specific reasons—first, to prevent any possibility of an overflow; second, if at any time it is desired to return any liquid to the cask, the piston C can be taken out and the liquid can be poured into the cylinder B.

After the siphon has been charged the piston C may be removed and the top of the cylinder B closed by a close-fitting cap, as once charging is sufficient for drawing the entire contents of the cask; hence I use the cylinder B for two distinct purposes: first, to charge the siphon with, and, second, through which I can return any liquid to the cask without removing the bung and siphon, as they are closely fitted together.

The short arm of the siphon passes into the cask through the bung, close to one side. This forms an eccentric, by which the siphon can be readily adjusted to different-length casks. Said bung is made as follows: The orifice in the bung H, through which the short arm of the siphon passes, is close to one side. Over the top of the bung is a metallic plate extending outward and forming a wide flange, R, which fits down close to the cask. The lower side of said flange is faced with some soft elastic substance, S, to prevent the escape of gas.

If at any time I wish to draw liquids from or near the bottom of the cask, the part I, with the two orifices, may be taken off and the part D inserted into the cask.

Operation: The short arm of the siphon A is put through the bung H into the liquid in the cask, the piston C being down. Then the orifice in the siphon at E being closed, the piston C is drawn up. This sufficiently exhausts the air in the siphon, and it becomes filled or charged with liquid in the cask, (the top G of the measure F not being hooked or closed down air-tight.) The orifice M in the turning-cock E is then brought in line with the orifice in the pipe D, and this brings the orifice N in line with the orifice K in the bottom of the measure F and the liquid runs into the measure. When the desired amount is in the measure, which can easily be seen by looking through the transparent top, the orifice M is turned up in line with the orifice K in the bottom of the measure F. This brings the orifice N in line with the discharge part of the pipe D, and the liquid runs from the measure F into the can or vessel placed to receive it. By this device the liquid flows direct from the cask into the can, and is measured on its passage, without any exposure to flies or filth or any danger from the escape of gas, when liquids are drawn from which the escape of gas is liable, and without any waste from sloppage or accidents in the use of loose measures.

Having described my invention or device, what I claim, and desire to secure by Letters Patent, is—

The combination, with the siphon A D, of the measure F, having the top G, in which is the transparent field P, indentures O O', deflecting-plate L, and orifice K, used in the manner and for the purpose set forth.

LESTER A. GOODRICH.

Witnesses:
STEPHEN N. BETTS,
OLEY YEAGLEY.